H. F. W. HUEG.
ROLL MAKING MACHINE.
APPLICATION FILED SEPT. 13, 1907.
956,099.
Patented Apr. 26, 1910.
2 SHEETS—SHEET 1.
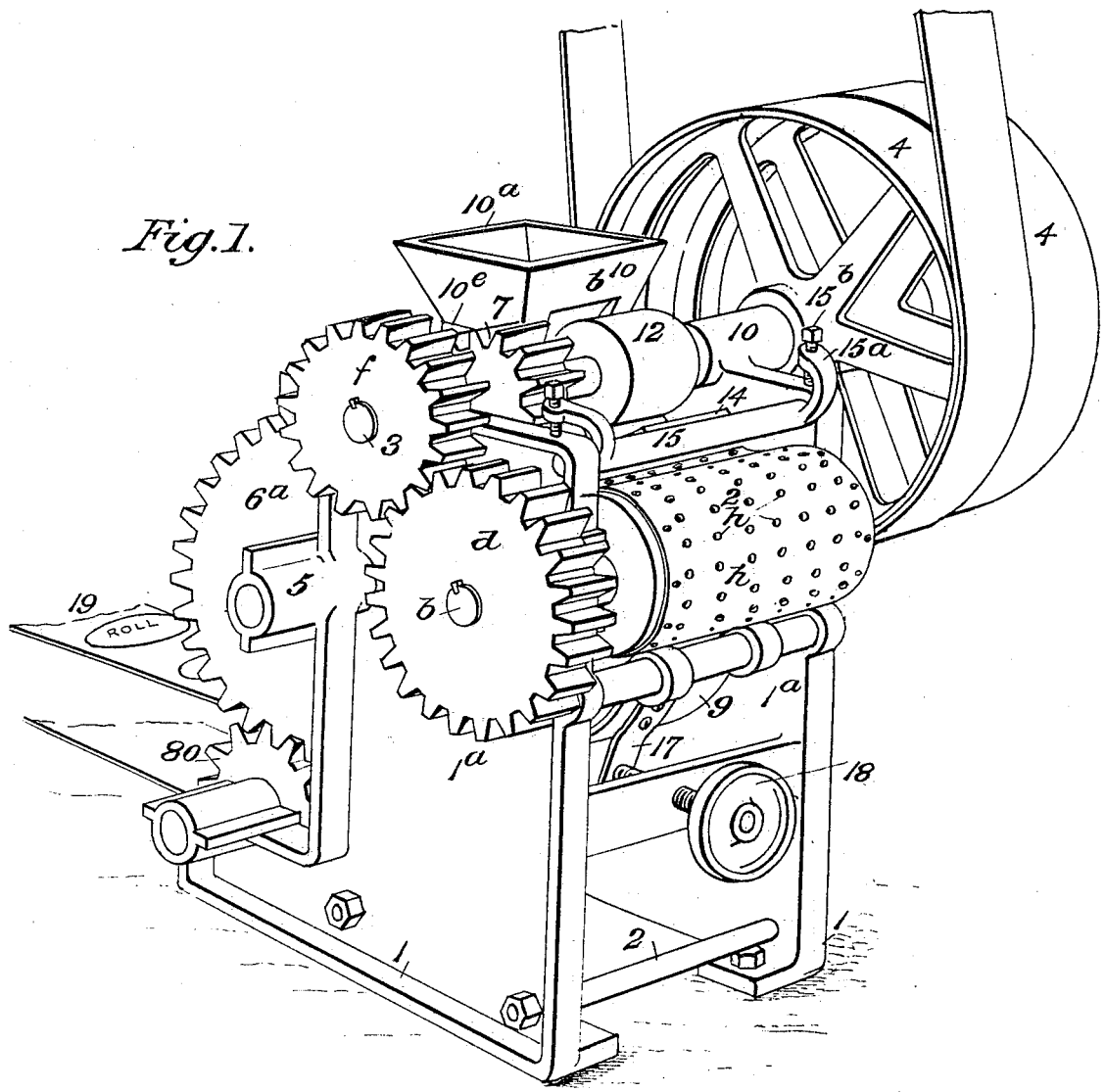
Fig. 1.
Fig. 4
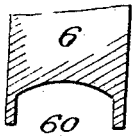 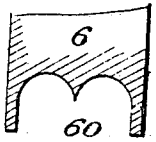 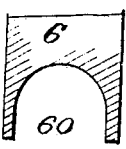
WITNESSES:
H. Woodard
Eleanor MacCormick
INVENTOR
H. F. W. Hueg
BY
Fred G. Dieterich
ATTORNEYS H. F. W. HUEG.
ROLL MAKING MACHINE.
APPLICATION FILED SEPT. 13, 1907.
956,099.
Patented Apr. 26, 1910.
2 SHEETS—SHEET 2.
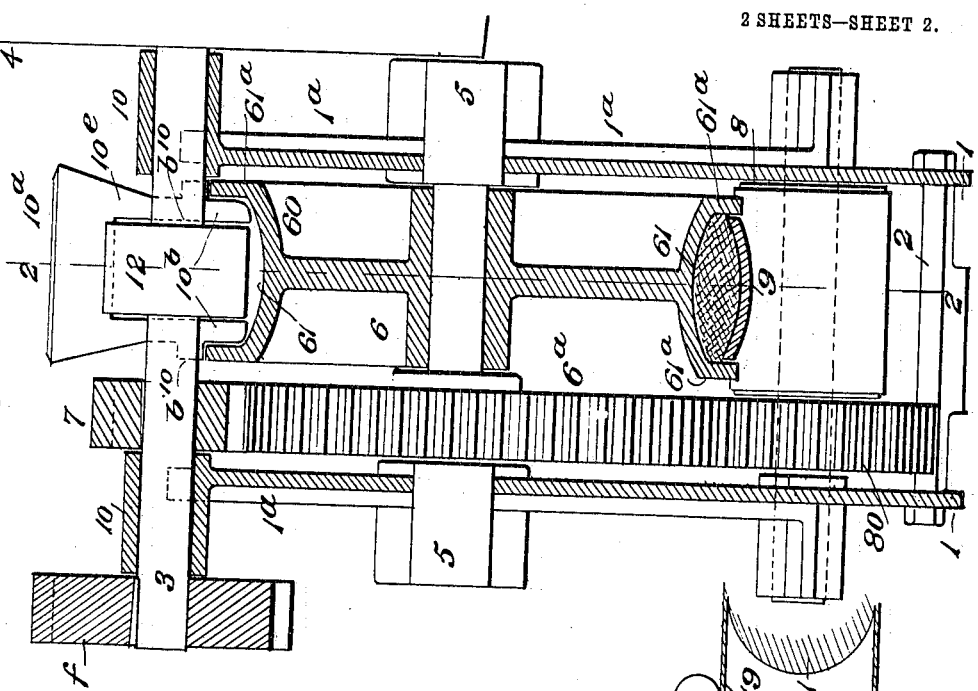
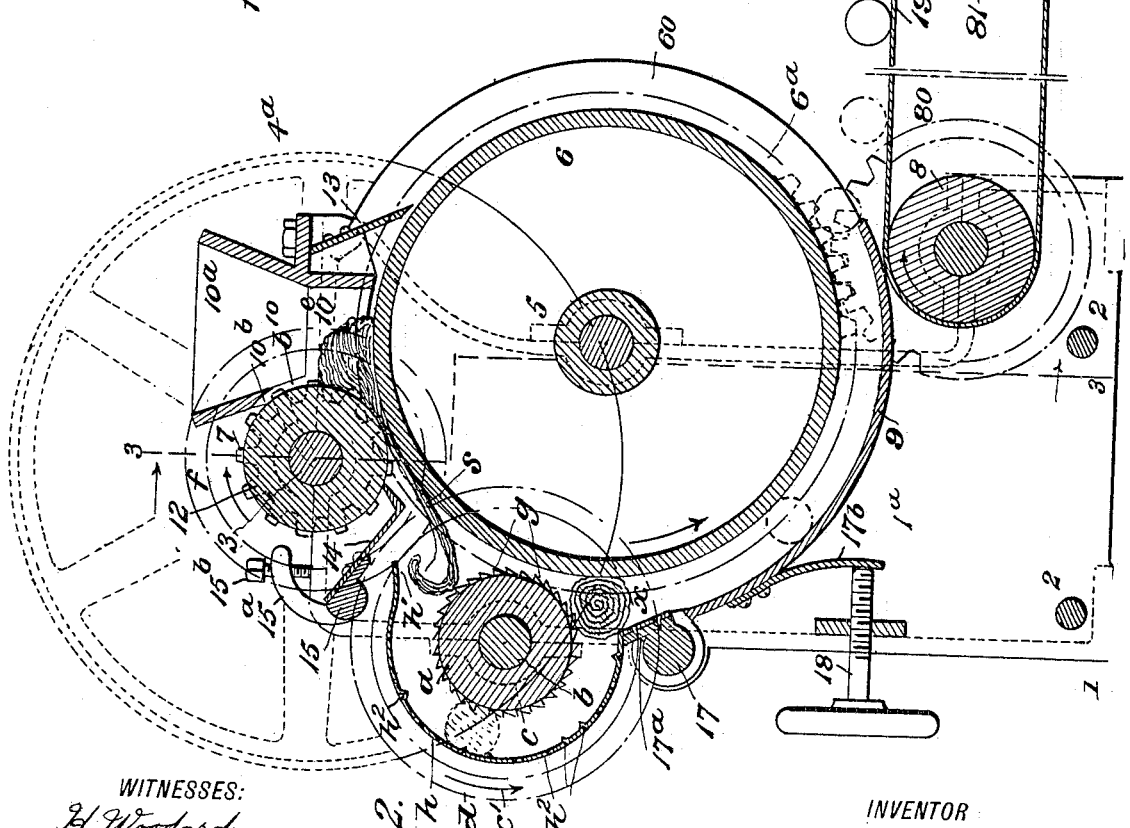
WITNESSES:
H. Woodard
Eleanor MacCormick
INVENTOR
H. F. W. Hueg.
BY
Fred G. Dieterich & Co.
ATTORNEYS

UNITED STATES PATENT OFFICE.

HERMAN F. W. HUEG, OF LONG ISLAND CITY, NEW YORK.

ROLL-MAKING MACHINE.

956,099.  Specification of Letters Patent. Patented Apr. 26, 1910.

Application filed September 13, 1907. Serial No. 392,799.

*To all whom it may concern:*

Be it known that I, HERMAN F. W. HUEG, residing at Long Island City, in the county of Queens and State of New York, have invented a new and Improved Roll-Making Machine, of which the following is a specification.

My present invention, which relates generally to improvements in means for molding dough into the desired shapes preparatory to baking, more particularly has for its purpose, to provide a roll making machine for bakers of a simple and economical construction, in which the manipulation of the plastic material is such that it is positively reduced to the desired shape uniformly and quickly, and in which the several parts have special relation whereby they can be readily adjusted for producing rolls of different forms and sizes.

That the essentials of my present invention may be readily understood by those skilled in the art to which it appertains, it should be here stated, that in its complete make up it includes a means known as the "curler", which curls or winds the material previously reduced to a sheet form, into a spiral or coiled condition which is afterward formed into the desired roll shape, ready to be discharged onto an off take or conveyer ready for the oven.

Heretofore in machines of the character mentioned, the curling devices or means, usually coöperate with the shaping drum, to effect the spiral winding or coiling of the preformed plastic sheet.

From practical experience with machines in which the drum forms a coöperative part of the curling means, I have found that the operation of curling does not meet the desired requirements, since the coils or rolls are more or less irregularly formed.

My invention in its generic nature differentiates from the general type of machines noted, in providing, in connection with dough sheet or bat forming devices and the drum, a coiling means independent of the drum, that takes up the plastic or dough sheet and curls it into uniformly shaped coils and then delivers said coils to be engaged and rolled by the drum.

My invention also comprehends an improved construction of coiling means, that takes the sheet and coils it, before it is delivered onto the drum to be rolled, in which is included a means for checking a slipping action of the dough as it is being coiled, whereby to provide for positively coiling the dough sheet so soon as it is engaged by the coiling devices and continuing the rotary action of the coiled plastic body until it is discharged and taken up by the final reducing or rolling means.

Another object of my invention is to provide a simple, improved and coöperative arrangement of parts whereby the dough masses are reduced to a bat or sheet, then coiled, reduced or rolled to shape, and then delivered onto an off take ready for the oven.

In its subordinate features my invention consists in certain details of construction and peculiar combination of parts pointed out in the appended claims, and illustrated in the accompanying drawings in which:—

Figure 1, is a perspective view of my invention. Fig. 2, is a vertical longitudinal section thereof on the line 2—2 on Fig. 3. Fig. 3, is a transverse section thereof, taken substantially on the line 3—3 on Fig. 2. Fig. 4, is a diagrammatic view showing different shapes of drum rims.

In carrying out my invention, I arrange the several parts of the machine as generally shown on Fig. 1, by reference to which it will be observed the frame work comprises two opposite side members, each consisting of a base portion 1 and an upright portion 1ª, and which are relatively rigidly held by the cross shafts presently referred to, and stay rods 2—2. Journaled in bearings 10—10 formed on the upper ends of the frame members 1ª, 1ª is the drive shaft 3, provided with their usual fast or loose belt pulleys 4—4 as shown. Mounted in the long bearings 5—5 on the front end of the side frames is the shaping or rolling drum 6, the shaft of which carries a large gear 6ª that meshes with a smaller gear 7 on the drive shaft 3 from which it is driven, it also meshing with and driving a gear 80 on the shaft that carries a pulley 8 which forms a part of the roll off take devices, hereinafter referred to. The drum 6 consists of a spider frame having a circumferential shaping rim 60, that is shaped in cross section to suit the shape and length of the rolls to be made, it, in the drawing, being shown concaved as at 61 and with straight ends 61ª whereby, in connection with the convexed compression plate 9 presently again referred to, a roll of a substantially egg shape is made as shown in Fig. 3, it being understood, however, that the cross sectional shape of the drum rim and the compression plate may be readily varied to suit the desired shape of the roll wanted. Suitably mounted on the top of the frame work and in the vertical axis of the drum, is a bottomless hopper $10^a$, into which the batches of the dough are placed, the sides $10^c$ of said hopper being in vertical alinement with the side flanges of the drum, and the lower ends $10^b$, $10^b$ of the said side project down beneath the drum flanges, (see Fig. 3,) the lower edge of the forward end $10^b$ being slotted as at $b^{10}$ to straddle the reducing roller 12, mounted on the drum shaft 3, in rear of the hopper, and positioned to coöperate with the drum to reduce the material into a sheet or bat and feed the said sheet forward to the curling devices presently described.

13 designates a scraper adjustably secured to the hopper to clear the drum face, and 14 designates a scraper blade that engages the reducing roll, it being mounted on a rock shaft 15, having an angle arm $15^a$, provided with an adjusting screw $15^b$, for regulating the pressure of the scraper on the reducing roller 12.

The compression plate 9 before referred to, is of width to extend within the drum flanges and said plate is of stout spring metal and extends over the discharging portion of the drum, it being secured at the upper end only by connection with the flattened portions $17^a$ of a tie bolt 17. To hold the compression plate 9 under a desired tension with respect to the drum, with which it coöperates to form the final roll reducing means, a spring metal arm $17^b$ is pendently secured to the plate 9 with which engages an adjusting screw 18, by which proper adjustments of the compression plate 9 is provided for. The outer or delivery end of the compression plate, extends forward of the axis of the drum and terminates over the endless conveyer or off take belt 19, that takes around the drum pulley 8 and around another pulley 81, mounted at any suitable point in the bake shop, it being understood the parts are driven to carry the shaped rolls in the direction indicated by the arrow on Fig. 2. The upper end of the compression plate 9 is disposed approximately in the horizontal axial plane of the drum 6, and it is inclined outwardly from the drum whereby to form a mouth to receive the coiled dough portions $x$ as the discharge from the curling means, the construction of which and the manner in which they are mounted relatively to the dough reducing and shaping devices, forming the essential features of my present invention.

The curling means, the construction of which is best shown in Fig. 2, comprise a roller $a$, fixedly mounted on a cross shaft $b$, journaled in bearing $c$ on the back edges of the side frame, and which carries a gear $d$, that is driven to rotate in the direction indicated by the arrow $c'$, by a gear $f$, mounted on the main drive shaft as shown. The roller $a$, is positioned near the upper portion of the down going side of the drum 6 and it projects into the hollow rim of the said drum, whereby to engage the dough sheet as it is carried down with the drum, and to insure a positive coiling or turning up of the end of the said dough sheet, the roller $a$ has a series of transverse teeth or serrations $g$—$g$ that grip the dough sufficiently to hold it from slipping back. The roller $a$ coöperates with a guard plate $h$, that extends from the receiving end of the curling means concentrically with the roller $a$ to the discharging end of the said curling means, its lower end being made fast to the cross bolt 17. The guard plate $h$, from the receiving end, where it is slightly curved up as at $h'$ so as not to present an abrupt edge to the dough as it begins to coil, is spaced its entire length uniformly from the roller $a$ whereby to present a coiling passage of regular width from the entrance to the discharge thereof. For coöperating with the toothed or serrated surface of the roller $a$, the guard $h$ is formed with a series of small apertures or indentations $h^2$, the said series preferably corresponding with the serrations or teeth on the roller $a$, such indentures or apertures preventing slipping action of the dough as it is carried forward through the coiling passage and insuring with the teeth on the roller $a$, a positive rolling or coiling action of the dough, continuously, as it passes through the coiling passage.

The ends of the coiling passage are closed so that in discharging the coiled dough portions, they enter between the flanges of the drum, and to provide for positively starting the coiling as soon as the dough comes from the roller 12, the perforated guard plate is fastened at its lower end only in order to get the desired spring or tension at the receiving end for engaging the curled ends of the dough as will be clearly understood by reference to Fig. 2.

Operation: The dough batch or mass, of which the roll is to be made, is dropped into the hopper onto the drum 6, which in connection with the reducing roll spreads the mass into a sheet or bat, $s$ which as it is carried forward engages the toothed roller $a$, which traveling in the opposite direction of drum 6, arrests the advance of the dough sheet and causes its end to curl as indicated on Fig. 2, which action continues on the still advancing portions of the sheet until the entire sheeted mass has been curled into a coil between the roller $a$ and the guard $h$, when by reason of the stationary guard $h$, and the toothed rotating roller $a$ the coil is carried forward through the passage between the plate $h$ and the roller $a$ continuously coiling or rotating as it passes to the discharge end of the said passage, when the coil in its expanded shape drops back into the combined shaping and final reducing passage formed by the drum and the opposing compression plate 9, where it is again constantly turned over and over and at the same time compressed to final shape, and caused to pass out from the roller and compressing plate onto the off take or conveyer, as clearly indicated in Fig. 2. It is understood, that as soon as one sheet mass has been curled up and enters the coiling passage, another batch of dough is placed into the hopper to be operated on, and so on. By hanging, as it were, the compression plate from one end, providing it with a spring tension device, capable of adjustment as shown, the desired pressure of the compression plate can be easily provided for to suit the character of the material being worked, by providing curling means that operate independent of the drum and which include a positively adjusted or sized curling passage, a uniform and positive curling of all the batches, is obtained, and the irregular coiling, which I have found occurs when the curling means comprise a serrated member that coöperates with the drum, is absolutely overcome. By serrating the curling roller $a$ and its coöperating plate $h$, a sufficient grip is exerted by the teeth on the roller $a$ and resistance by the indentures or apertures in plate $h$ to insure a constant turning over of the coil as it passes forward with the roller $a$ to the final shaping means.

While for simplicity of structure and compact arrangement of parts, I prefer to position the curling means with respect to the drum and the reducing roll, its arrangement, as also the detail arrangement of the other parts, may readily be modified without departing from my invention as defined in the appended claims.

It will be understood that the peripheral face or rim of the drum may be of varied shapes, for example as shown by Fig. 4 to provide for the desired shapes of rolls.

Having thus described my invention, what I claim and desire to secure by Letters Patent is:—

1. The combination with the drum, the means for primarily reducing the plastic material to a sheet and a means independent of the other means for coiling the plastic sheet; of a compressing plate that extends concentrically under the discharging end of the drum, and means for holding the said plate under spring tension, as set forth.

2. The combination with the drum and the curling devices as shown, of the compression plate freely sustained at its upper end to a cross bar of the main frame, said plate being turned to extend over the down going side of the drum, a spring member pendent from the plate and an adjusting screw for engaging said member as set forth.

HERMAN F. W. HUEG.

Witnesses:
 JACOB FRIEAUFF,
 MORITZ BARON.